(No Model.)
R. W. AITKEN.
CONNECTING ROD.
No. 425,119. Patented Apr. 8, 1890.
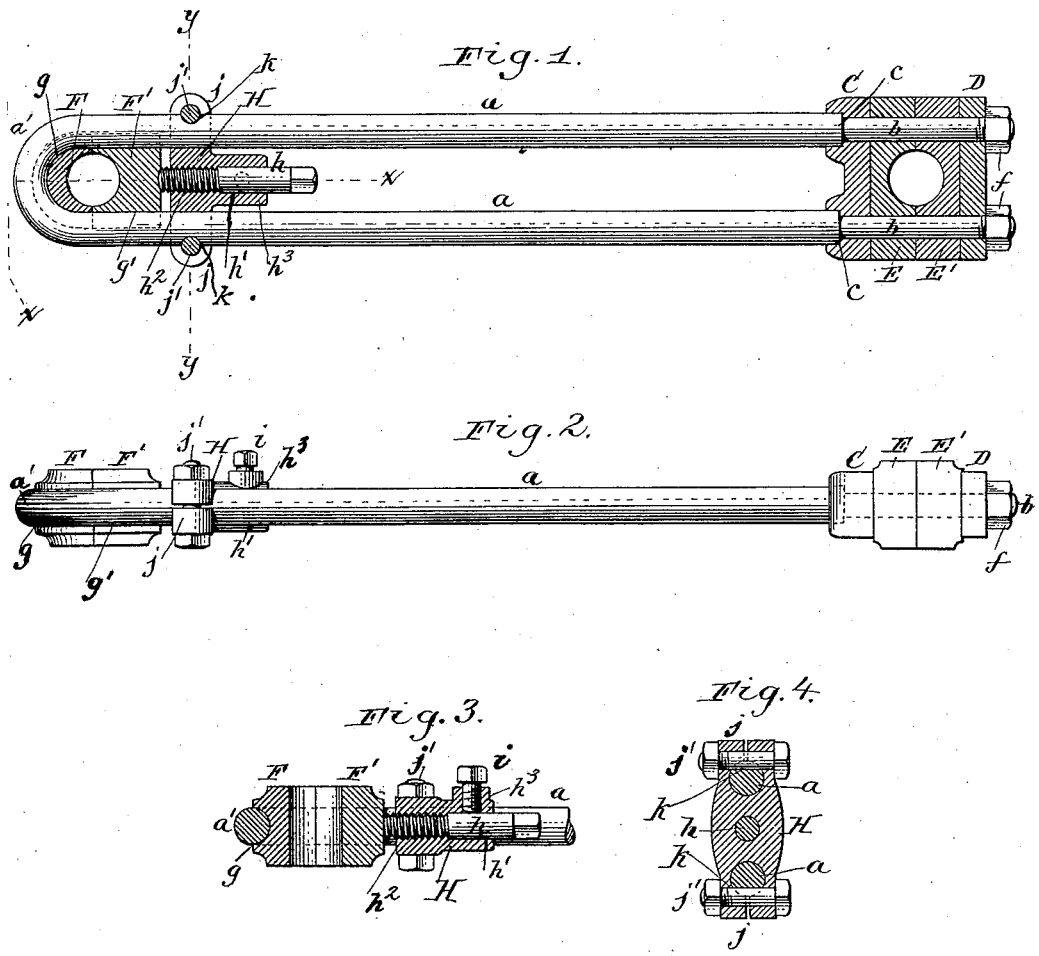

UNITED STATES PATENT OFFICE.

ROBERT W. AITKEN, OF BUFFALO, NEW YORK, ASSIGNOR OF ONE-HALF TO ROBERT LAWS, OF SAME PLACE.

CONNECTING-ROD.

SPECIFICATION forming part of Letters Patent No. 425,119, dated April 8, 1890.

Application filed July 23, 1889. Serial No. 318,357. (No model.)

*To all whom it may concern:*

Be it known that I, ROBERT W. AITKEN, a citizen of the United States, residing at Buffalo, in the county of Erie and State of New York, have invented new and useful Improvements in Connecting-Rods, of which the following is a specification.

This invention relates to that class of connecting-rods in which the body of the rod is formed of a strap, bar, or rod bent or doubled back upon itself; and the object of my invention is to produce a light and durable connecting-rod of this kind, which dispenses with the usual cross-bolts, gibs, and keys for adjusting the bearings, and which is simple in construction and can be manufactured at comparatively small expense.

In the accompanying drawings, Figure 1 is a longitudinal sectional elevation of my improved connecting-rod. Fig. 2 is a top plan view thereof. Fig. 3 is a horizontal section in line $x\ x$, Fig. 1. Fig. 4 is a vertical transverse section in line $y\ y$, Fig. 1.

Like letters of reference refer to like parts in the several figures.

The frame or body of the connecting-rod is constructed of a single piece of wrought iron or steel, preferably rolled bar-iron, which is bent to form two parallel bars or rods $a\ a$ and a connecting bend or bow $a'$. The free ends of the rods $a$ are preferably reduced in diameter and screw-threaded and form shanks $b$, to which are secured the bearings or brasses for the crank-pin.

C represents a cross-bar or plate connecting the ends of the rods $a$, and provided with openings, through which the shanks $b$ are inserted, and whereby the rods are held parallel with each other and prevented from spreading. The cross-bar C bears against shoulders $c$, formed at the junction of the shanks $b$ with rods $a$. The shoulders are seated in sockets formed in the cross-bar C.

D represents a similar cross bar or plate connecting the outer ends of the shanks $b$, and provided with openings arranged in line with the openings in the cross-bar C to receive the ends of the shanks.

E E' represents the half-bearings or brasses applied to the shanks of the rods $a\ a$ between the cross bars or plates C and D, and which embrace the crank-pin or other part to which the rod is connected. The bearings E E' are provided with openings, through which the shanks $b\ b$ pass. The bearings E E' rest, respectively, with their outer flat faces against the flat faces of the cross-plates C and D. The outer bearing E' is moved toward the inner bearing E by screw-nuts $f f$, arranged on the outer threaded ends of the shanks $b$ and bearing against the outer face of the cross-bar D, thereby tightening the bearings upon the journal or crank-pin, which they embrace.

F F' represent the half-bearings arranged at the opposite end of the connecting-rod, between the rods $a$ and bow $a'$. The outer bearing F has its outer convex surface provided with a semicircular groove or recess $g$, in which the inner surface of the bow $a'$ is seated. The inner bearing F' is provided on its upper and lower edges with semicircular recesses or grooves $g'$ to receive the inner sides of the rods $a\ a$. The recesses or grooves $g\ g'$ retain the bearings between the rods $a\ a$ and prevent their lateral displacement.

H represents a cross-bar arranged between the rods $a\ a$, near the inner bearing F', and provided with a longitudinal adjusting-screw $h$, which bears against the inner bearing F', and whereby the latter is tightened against or moved toward the outer bearing F. The adjusting-screw $h$ is arranged in a socket $h'$, formed in the cross-bar H and having a threaded inner portion $h^2$, which engages with the threaded portion of the adjusting-screw.

$i$ represents a set-screw arranged transversely in the outer portion $h^3$ of the socket and engaging against the smooth outer surface of the adjusting-screw, whereby the latter is held against turning in the socket.

The cross-bar H is secured to the rods $a\ a$ by split sockets $j$, which embrace the rods $a$, and which are provided with bolts $j'$, connecting the two jaws of each socket. The bolts $j'$ pass through openings formed in the jaws of the split sockets $j$, and are seated in a semicircular groove $k$, formed in the outer side of each rod $a$. Upon tightening the bolts $j'$ the cross-bar H is firmly clamped upon the rods $a$, and is held from longitudinal movement on the rods by the bolts $j'$ projecting into the grooves $k$. The cross-bar H also prevents any spreading of the rods $a$, and assists in holding the latter rigidly in place. Each of the bearings at the opposite ends of the connecting-rod can be readily adjusted for wear independently of the other bearing.

My improved connecting-rod can be produced at comparatively small expense, as the parts require no special fitting, and the usual end straps and cross-bolts and gibs and keys which require to be fitted with great care are dispensed with. I also avoid the shearing strains to which these parts are subjected, as the tensile and compressing strains are brought to bear directly upon the rods $a\ a$.

I claim as my invention—

1. A connecting-rod composed of a single bar or rod bent to form two parallel rods and a connecting-bow and provided with separate and independently-adjustable end bearings, substantially as set forth.

2. In a connecting-rod, the combination, with the rods $a\ a$ and connecting-bow $a'$, bent of a single bar or rod, the rods being provided with longitudinal screw-shanks at their ends, of bearings adjustably mounted on said screw-shanks, bearings seated in the connecting-bow and the adjacent portions of the rods, and a longitudinal adjusting-screw, whereby said last-named bearings are adjusted, substantially as set forth.

3. In a connecting-rod, the combination, with the rods $a\ a$ and connecting-bow $a'$, bent from a single bar or rod, of the shanks $b$, formed on the ends of said rods and provided with screw-threads, cross-bars C D, applied to said shanks, bearings E E', applied to said shanks between the cross-bars C D, and screw-nuts $f\ f$, applied to said shanks and bearing against one of said cross-bars, substantially as set forth.

4. In a connecting-rod, the combination, with the rods $a\ a$ and connecting-bow $a'$, bent from a single bar or rod, of bearings F F', arranged between said rods and seated against said bow, a cross-bar H, secured to said rods on the inner sides of said bearings, and an adjusting-screw arranged in said cross-bar and engaging against said bearings, substantially as set forth.

5. In a connecting-rod, the combination, with the rods $a\ a$ and connecting-bow $a'$, formed from a single bar or rod, of the bearings F F', arranged between the rods $a\ a$ and seated against said bow, a cross-bar H, provided with split sockets $j$, embracing the rods $a\ a$, clamping-bolts $j'$, connecting the jaws of the split sockets and seated in recesses formed in the rods $a\ a$, and an adjusting-screw $h$, engaging against the bearings F F', substantially as set forth.

6. The combination, in a connecting-rod, with the rods $a\ a$, connecting-bow $a'$, formed integral with the rods, and shanks $b\ b$, provided with screw-threads, of the bearings F F', arranged between said rods and seated against the bow $a'$, a cross-bar secured to said rods and provided with a screw-threaded socket $h$, an adjusting-screw arranged in said socket and engaging against said bearings, cross-bars C D, secured to the shanks $b\ b$, bearings arranged between said cross-bars, and screw-nuts $f$, secured to the threaded ends of said shanks, substantially as set forth.

Witness my hand this 27th day of June, 1889.

ROBERT W. AITKEN.

Witnesses:
F. C. GEYER,
ALICE G. CONNELLY.